3,037,941
PHOTOCONDUCTIVE MATERIALS

Peter Whitten Ranby, and Doreen Yvonne Hobbs, London, England, assignors to Thorn Electrical Industries Limited, London, England
No Drawing. Filed July 15, 1959, Ser. No. 827,172
3 Claims. (Cl. 252—501)

The present invention relates to photoconductive materials.

For some purposes finely divided photoconductive powders are required. For example in the preparation of screens of X-ray image intensifiers, light amplifiers and photocells, it is required to lay down a layer of accurately controlled thickness of photoconductive material in, for example, an enamel.

It is known to produce photoconductive cadmium sulphide activated by copper by heating a mixture of precipitated cadmium sulphide with a copper compound in the presence of a metal halide or ammonium halide. On heating to a temperature of 600°–1000° C. during preparation, however, the product is in the form of a hard sintered mass which is difficult to reduce to powder form except by grinding. Grinding, however, is harmful because it adversely affects the photoconductive properties of the product. Washing before grinding can produce some powder which will pass through a 150-mesh sieve but the yield is of the order of 20%.

Thus the majority of the product produced in this known manner is of no value as photoconductive material, and as cadmium sulphide is expensive the cost of manufacturing this photoconductive material in powder form is extremely high.

It is one object of the present invention to provide an improved method of manufacturing photoconductive material in powder form in which the yield may be as high as 85%.

According to the present invention a method of manufacturing photoconductive material includes the step of heating a mixture of precipitated cadmium sulphide and a copper compound with a halide flux and a lithium compound, the quantity of lithium compound being such that the quantity of lithium present expressed as a percentage, by weight, of the cadmium sulphide is between 0.005% and 0.5%. It has been found that photoconductive material produced by this method readily breaks down into finely divided powder form on washing in appropriate liquids and up to 85% of the product will pass through a 150-mesh sieve and show photoconductive properties.

The halide flux can be, for example, the chloride of an alkaline or alkaline earth metal or of the ammonium ion. Alternatively the bromide or iodide of these elements or mixtures of the halides can be used.

The temperature at which heating is effected is preferably about 800° C. but a wide range of temperatures would suffice. The preferred range is 700° C. to 900° C. but an extension of this range to 600°–1000° C. and even wider is contemplated. The heating can be carried out in a closed silica crucible or plugged tube. It will be understood that the materials used should be of a high degree of purity.

The lithium compound may be, for example, the carbonate, the sulphate or the oxalate of lithium.

The invention will now be described with reference to the following two examples:

Example I

The following were mixed into a paste and dried at 150° C.:

Pure precipitated cadmium sulphide _____ g__ 50
Aqueous solution of magnesium chloride containing
  50% of magnesium chloride _____ ml__ 4
Aqueous solution of copper sulphate containing 0.2%
  of copper _____ ml__ 10
Lithium carbonate _____ g__ 0.2

The dried paste was ground and then heated in a closed silica crucible at a temperature of 800° C. for one hour.

When cool the product was washed with strong ammonia solution of 0.88 sp. gr. then with water followed by dilute acetic acid and finally again with water and was dried.

The product is a finely divided powder of which about 85% passed through a 150-mesh sieve and showed strong photoconductive properties.

Example II

The same procedure was used as in Example I but omitting the magnesium chloride and adding 0.6 g. of ammonium chloride.

Again the product was in finely divided powder form of which about 85% passed through a 150-mesh sieve and showed strong photoconductive properties.

Experiments have shown that as the quantity of lithium approaches the upper limit (0.5%) of the given range, the photoconductive properties of the product decrease and when the quantity exceeds the upper limit the product is no longer commercially useful as photoconductive material.

When the quantity of lithium falls below the lower limit of the given range the product approaches the known hard sintered mass which does not readily break down on washing.

We claim:

1. A process for producing a finely divided photoconductive powder comprising the steps of mixing cadmium sulfide with a copper activator, a chloride coactivator, and a compound selected from the class consisting of lithium carbonate, lithium sulfate and lithium oxalate, there being about 0.2% of said activator by weight of said sulfide, about 1.2–4.4% of said coactivator by weight of said sulfide and about 0.005%–0.5% of lithium by weight of said sulfide; firing said mixture in a closed container to a temperature falling within the range of 700–900° C.; cooling the fired product to room temperature; and washing and drying said cooled product to produce said powder.

2. A process for producing a finely divided photoconductive powder comprising the steps of mixing cadmium sulfide with a copper activator, a chloride coactivator selected from the class consisting of magnesium chloride and ammonium chloride, and a compound selected from the class consisting of lithium carbonate, lithium sulfate and lithium oxalate, there being about 0.2% of said activator by weight of said sulfide, about 1.2–4.4% of said coactivator by weight of said sulfide and about 0.005%–0.5% of lithium by weight of said sulfide; firing said mixture in a closed container to a temperature falling within the range 700–900° C.; cooling the fired product to room temperature; washing and drying said cooled product to produce said powder; and dropping said powder onto a 150 mesh sieve, about 85% by weight of said powder passing through said sieve.

3. A process for producing a finely divided photoconductive powder comprising the steps of mixing cadmium sulfide with a copper activator, a chloride coactivator selected from the class consisting of magnesium chloride and ammonium chloride, and lithium carbonate, there being about 0.2% of said activator by weight of said sulfide, about 1.2–4.4% of said coactivator by weight of said sulfide and about .04% of lithium by weight of said sulfide; firing said mixture in a closed container to a temperature falling within the range 700–900° C.; cooling the fired product to room temperature; and washing and drying said cooled product to produce said powder.

References Cited in the file of this patent

UNITED STATES PATENTS

| | | |
|---|---|---|
| 2,765,385 | Thomsen | Oct. 2, 1956 |
| 2,843,914 | Koury | July 22, 1958 |
| 2,876,202 | Busanovich et al. | Mar. 3, 1959 |
| 2,986,534 | Beutler | May 30, 1961 |